United States Patent Office 3,687,839
Patented Aug. 29, 1972

3,687,839
CONVERSION WITH SYNTHETIC CRYSTALLINE ZEOLITE
Edwin Earl Jenkins, Elmer, N.J., assignor to Mobil Oil Corporation
No Drawing. Original application Apr. 1, 1968, Ser. No. 717,978. Divided and this application Dec. 22, 1970, Ser. No. 100,781
Int. Cl. C10g *11/18, 13/02*
U.S. Cl. 208—111
8 Claims

ABSTRACT OF THE DISCLOSURE

A method of converting hydrocarbons employing a catalyst comprising a crystalline aluminosilicate zeolite having a formula, in terms of mole ratios of oxides, as follows:

$$(1.1\pm.4)\ M_{2/n}O:Al_2O_3:5-8\ SiO_2:zH_2O$$

wherein M is a cation selected from the group consisting of hydrogen, ammonium, alkylammonium, arylammonium, metals, and mixtures thereof other than a mixture of sodium and potassium, $n$ is the valence of M, and $z$ is between 0 and 8, having an X-ray powder diffraction pattern substantially the same as that shown in Table 1 of the specification said X-ray diffraction pattern being characterized by the absence of odd $l$ lines and capable of sorbing at least 1.5 weight percent cyclohexane at 25° C. and 20 mm. Hg.

RELATED APPLICATIONS

This application is a division of copending application Ser. No. 717,978, filed Apr. 1, 1968 (now U.S. Pat. 3,578,398).

BACKGROUND OF THE INVENTION

Field of the invention

This invention relates to novel crystalline aluminosilicates and to methods for their preparation. More particularly, this invention relates to novel crystalline aluminosilicates having catalytic properties and to methods for utilizing such catalysts in hydrocarbon conversion reactions.

Description of the prior art

Zeolite materials, both natural and synthetic, have been demonstrated in the past to have catalytic capabilities for various types of hydrocarbon conversion reactions, especially catalytic cracking. Certain of these zeolite materials comprise ordered, porous crystalline aluminosilicates having a definite crystalline structure, as determined by X-ray diffraction, within which there are a large number of small cavities which are interconnected by a series of still smaller channels or pores. These cavities and pores are precisely uniform in size within a specific zeolite material. Since the dimensions of these pores are such as to accept for adsorption molecules of certain dimensions while rejecting those of larger dimensions, these materials have come to be known as "molecular sieves," and are utilized in a variety of ways to take advantage of the adsorptive properties of these compositions.

These molecular sieves include a wide variety of positive ion-containing crystalline aluminosilicates, both natural and synthetic. Among the synthetic zeolites are those known as A, Y, L, D, R, S, T, Z, E, F, Q, B, X. All can generally be described as having a rigid 3-dimensional network of $SiO_4$ and $AlO_4$ in which the tetrahedra are cross-linked by the sharing of oxygen atoms whereby the ratio of total aluminum and silicon atoms to oxygen atoms is 1:2. The electrovalence of the tetrahedra containing alumina is negatively charged and the composition is balanced by the inclusion in the crystal structure of a cation such as an alkali metal and alkaline earth metal cation. These synthetic zeolites have definite crystalline structures as determined by X-ray analysis. The natural zeolites are also crystalline as revealed by X-ray analysis and in many cases, the zeolites have a characteristic X-ray pattern which distinguishes them from other zeolites. For instance, erionite, a naturally occurring zeolite, has a definite crystalline structure in which a layer of tetrahedra seems to be rotated about 60° out of phase with the balance of the crystal whereby X-ray analysis reveals "stacking faults" in the repetitive arrangement of the layers of tetrahedra in the crystal. Zeolite T, a synthetic zeolite, has an X-ray diffraction pattern similar to erionite in that it contains these "stacking faults." Offretite, another naturally occurring, but comparatively rare, zeolite, has a chemical composition similar to erionite and zeolite T and has a similar crystal structure to that of erionite and zeolite T with the notable exception of being devoid of these "stacking faults." It has a lattice parameter twice that of erionite and zeolite T due to the fact that it contains no "stacking faults." These "stacking faults" can be identified by X-ray, as discussed hereinafter.

SUMMARY OF THE INVENTION

Broadly, this invention contemplates a crystalline aluminosilicate having a composition, in terms of mole ratios of oxides, as follows:

$$(1.1\pm.4)\ M_{2/n}O:Al_2O_3:5-8\ SiO_2:zH_2O$$

wherein M is a cation other than a mixture of sodium and potassium, $n$ is the valence of said cation, and $z$ is between 0 and 8 and having an X-ray powder diffraction pattern substantially the same as that shown in Table 1 below. The new zeolite has the ability to sorb cyclohexane in amounts at least about 1.5 percent by weight at 25° C. and 20 mm. Hg. It can also sorb up to and including 7.2 weight percent n-hexene.

The composition in its synthesized form can be expressed in terms of mole ratios of oxides as follows:

$$(1.1\pm.4)\ [xR_2O:(1-x)(M_{2/n}O]:Al_2O_3:5-8\ SiO_2:zH_2O$$

wherein $n$ and $z$ have the previously assigned significance, $x$ is betwen 0.001 and 0.5, R is tetramethylammonium and M is a mixture of sodium and potassium. In this regard it is to be understood that the mixture can also include lithium.

The as synthesized form of the composition can undergo ion exchange to exchange at least a portion of the original cations for other cations in which case the composition can be represented in terms of mole ratios of oxides as follows:

$$(1.1\pm.4)M_{2/n}O:Al_2O_3:5-8\ SiO_2:zH_2O$$

wherein $n$ and $z$ have the previously assigned significance and M is selected from the group consisting of tetramethylammonium, hydrogen, ammonium and metals and other than a mixture of sodium and potassium. Preferably M is a cation other than an alkali metal cation. Particularly desirable metal cations are those in which that form of the composition has catalytic activity. These include metals of Group II and Group VIII of the Periodic Table and manganese. Of the Group II metals, zinc is preferred especially in a form wherein some of the cation sites are occupied by a hydrogen ion. A form of the zeolite wherein M is hydrogen, ammonium, alkylammonium, arylammonium, or a metal can be beneficially converted to another form by thermal treatment at a temperature of at least 700° F. for at least 1 minute, generally not longer than 20 hours. While subatmospheric pressure can be employed, atmospheric pressure is desired for reasons of convenience. It is preferred to perform the thermal treatment in the presence of moisture, although moisture is not absolutely necessary. The thermal treatment can be performed at a temperature up to about 1600° F. at which temperature some decomposition begins to occur. The thermally treated product is useful in the catalysis of some hydrocarbon conversion reactions.

This invention further contemplates hydrocarbon conversion in the presence of a catalyst comprising a catalytically active form of the synthetic crystalline aluminosilicate as defined above, particularly cracking and hydrocracking of lower molecular weight hydrocarbons.

This invention also contemplates a process for preparing a synthetic crystalline aluminosilicate which comprises preparing a mixture containing tetramethylammonium oxide, sodium oxide, potassium oxide, alumina, silica and water and having a composition, in terms of mole ratios of oxides, falling within the following ranges:

$$\frac{R_2O}{R_2O + Na_2O + K_2O} = .01-.79$$

$$\frac{R_2O + Na_2O + K_2O}{SiO_2} = .10-0.90$$

$$\frac{SiO_2}{Al_2O_3} = 2-100$$

$$\frac{H_2O}{R_2O + Na_2O + K_2O} = 20-51$$

maintaining the mixture at a temperature of at least 20° C. until crystals of said aluminosilicate are formed, and separating and recovering said crystals. As indicated above, in lieu of some sodium oxide or potassium oxide, lithium oxide can be used in which case a product having lithium, sodium and potassium cations in addition to tetramethylammonium cation and having the crystal structure of natural offretite is prepared. The amount of lithium oxide can generally be in the range of 2 to 20 mole percent.

As indicated above, the novel crystalline aluminosilicate has the crystal structure of offretite, as distinguished from erionite and Linde zeolite T. X-ray analysis of the novel compostion reveals that it is free of the "stacking faults" which distinguish offretite from erionite and zeolite T. The composition of this invention has the following characteristic X-ray diffraction pattern whose values are:

TABLE I

| 2 times theta | Relative intensity I/I₀ | Interplanar spacing, d(A.) |
| --- | --- | --- |
| 7.7 | 100 | 11.45 |
| 11.75 | 16.5 | 7.54 |
| 13.4 | 55.2 | 6.63 |
| 14.05 | 9.9 | 6.30 |
| 15.43 | 15.0 | 5.74 |
| 19.42 | 26.5 | 4.57 |
| 20.47 | 43.3 | 4.34 |
| 23.7 | 89.2 | 3.67 |
| 24.85 | 43.0 | 3.59 |
| 26.9 | 18.6 | 3.31 |
| 28.3 | 17.4 | 3.15 |
| 30.5 | 9.5 | 2.93 |
| 31.35 | 79.7 | 2.85 |
| 33.32 | 19.1 | 2.68 |
| 35.90 | 13.8 | 2.51 |

These values were determined by standard techniques. In order to verify the absence or presence of odd *l* lines, a stop or slow scan technique was used. The radiation was the K-alpha doublet of copper, and a Geiger counter spectrometer with a strip chart pen recorder was used. The scan speed was ½ degree 2 theta per minute. The peak heights, I, and the positions as a function of 2 times theta, where theta is the Bragg angle, were read from the spectrometer chart. From these, the relative intensities, 100 $I/I_o$, where $I_o$ is the intensity of the strongest line or peak, and d (obs), the interplanar spacing in angstroms, corresponding to the recorded lines, were calculated. In Table I the relative intensities are given numerically. It should be understood that the X-ray diffraction pattern is characteristic of all the species of the novel composition, including those wherein the sodium and/or potassium ion has been exchanged as by base exchange with another cation or cations.

This exchanged composition has substantially the same X-ray diffraction pattern as that set forth in Table I above. The "stacking faults" referred to above which exist in other crystalline aluminosilicates reveal what crystallographers call odd *l* lines in their X-ray diffraction patterns, occurring at the interplanar spacings in angstroms of 9.18, 5.34 and 4.16 corresponding to 2 times theta values of 9.63, 16.55 and 21.35, respectively.

The novel composition can suitably be prepared by forming a mixture containing $R_2O$, sodium oxide, potassium oxide, alumina, silica and water and having a composition, in terms of mole ratios of oxides, falling within the following ranges:

TABLE II

| | Broad | Preferred |
| --- | --- | --- |
| $\frac{R_2O}{R_2O + Na_2O + K_2O}$ | .01-.70 | 0.01-0.50 |
| $\frac{R_2O + Na_2O + K_2O}{SiO_2}$ | .10-0.90 | 0.2-.80 |
| $\frac{SiO_2}{Al_2O_3}$ | 2-100 | 10-50 |
| $\frac{H_2O}{R_2O + Na_2O + K_2O}$ | 20-51 | 25-45 | wherein R is a tetramethylammonium ion, maintaining the mixture at a temperature of at least about 20° C. and up to, say, 250° C. until crystals of the aluminosilicate are formed. Thereafter, the crystals are separated from the liquid and removed.

The composition can be prepared utilizing materials which supply the appropriate oxide. Such compositions include sodium aluminate, sodium silicate, potassium silicate, potassium hydroxide, silica hydrosol, silica gel, silicic acid, sodium hydroxide, tetramethylammonium hydroxide, etc. It will be understood that each oxide component utilized in the reaction mixture for preparing the novel aluminosilicate can be supplied by one or more initial reactants; for example, $Na_2O$ can be supplied by an aqueous solution of NaOH, or by an aqueous solution of sodium silicate, etc. and $K_2O$ can be supplied from KOH or potassium silicate. The reaction mixture can be prepared either batchwise or continuously. Crystal size and crystallization time of the new composition will vary with the reaction mixture employed. Crystallization generally takes place over a period of between two hours and ten days.

Generally speaking the ratio of sodium oxide to potassium oxide is between about .01 and 40, and preferably between about .01 and 10. These ratios can be provided simply by choosing relative amounts of the respective oxides within the reaction mixture as set forth above, i.e., if a novel zeolite is desired having a high potassium concentration, more potassium, say, as potassium hydroxide, is employed relative to sodium oxide in the reaction mixture. The total negative charge of the tetrahedra is balanced by the tetramethylammonium ions, the sodium ions, and the potassium ions in the zeolite.

It has been found that when preparing the novel crystalline zeolite of this invention, that if a wet amorphous mass is first prepared comprising sodium oxide, potassium oxide, silica, alumina and water, and permitted to age for at least about 15 hours, preferably between 24 and 200 hours, at a temperature at which crystallization will not readily take place, that submicron size particles of crystalline aluminosilicate product can be prepared. Other combinations of time and temperature can be selected that will result in the same aging effect. Larger size particles result generally if the tetramethylammonium ion source, such as an aqueous tetramethylammonium chloride solution, is contacted with the wet amorphous mass immediately after its preparation and placed in the crystallization environment. Generally speaking, where the wet amorphous mass is permitted to age for at least 15 hours, the resultant particles have a submicron size as indicated by their ability to pass through filter paper. This development is particularly significant because the intracrystalline diffusion resistance of the material is thereby drastically reduced. This enables more effective utilization of a catalytically active form of the zeolite in hydrocarbon processes. The new catalysts are advantageously used to replace prior art diffusion limited catalysts.

The new zeolite can be exchanged to remove the sodium and/or potassium cations by such ions as hydrogen from acids, ammonium, alkylammonium and arylammonium, providing that stearic hindrances do not prevent the cations from entering the cages of the zeolite. The hydrogen form of the catalytic material is useful in such acid catalyzed hydrocarbon conversion processes as isomerization, polymerization, cracking and alkylation. Additionally, the catalyst can be used in its alkali metal form as an adsorbent or can be further base exchanged with an ammonium ion thereby replacing sodium or potassium cations in the structure. The exchanged composition can then be heated at a temperature of say, 400° F., causing evolution of ammonia and retention of a proton in the composition at the site previously occupied by the ammonium ion.

Other replacing cations include cations of the metals of Groups I-A other than sodium and potassium, I-B-VIII of the Periodic Table; especially metals of Groups II and III, including the rare earth metals, tin, lead, Group IV-B comprising titanium, zirconium, and hafnium; actinium, metals of the actinide series, thorium, antimony, bismuth, chromium; also Group VII-B and Group VIII. Regardless of the cations replacing the sodium or potassium in the synthesized form of the composition, the spatial arrangement of the aluminum, silicon and oxygen atoms which form the basic crystal lattice of this material, remains essentially unchanged by the described replacement of sodium or potassium as determined by X-ray diffraction analysis of the ion-exchanged material.

Ion exchange of the zeolite can be accomplished conventionally by contacting the zeolite with a solution, suitably an aqueous solution, of a salt of the exchanging cation. Additionally, the composition can undergo solid state exchange to remove sodium or potassium and substitute another cation therefor. Preferably a solution exchange is employed.

A wide variety of acidic compounds can be employed to prepare the hydrogen form of the catalyst. These acidic compounds, which are a source of hydrogen ions, include both inorganic and organic acids.

Representative inorganic acids which can be employed include acids such as hydrochloric acid, hypochlorous acid, chloroplatinic acid, sulfuric acid, sulfurous acid, hydrosulfuric acid, peroxydisulfonic acid ($H_2S_2O_8$), peroxymonosulfuric acid ($H_2SO_5$), dithionic acid ($H_2S_2O_6$), sulfamic acid ($H_2NHS_3H$), amidodisulfonic acid $(NH(SO_3H)_2)$ chlorosulfuric acid, thiocyanic acid, hyposulfurous acid ($H_2S_2O_4$), pyrosulfuric acid ($H_2S_2O_7$), thiosulfuric acid ($H_2S_2O_3$), nitrosulfonic acid ($HSO_3 \cdot NO$) hydroxylamine disulfonic acid $(HSO_3)_2NOH$, nitric acid, nitrous acid, hyponitrous acid, carbonic acid and the like.

Typical organic acids which find utility in the practice of the invention include the monocarboxylic, dicarboxylic and polycarboxylic acids which can be aliphatic, aromatic or cycloaliphatic in nature.

Representative aliphatic monocarboxylic, dicarboxylic and polycarboxylic acids include the saturated and unsaturated substituted and unsubstituted acids such as formic acid, acetic acid, chloroacetic acid, dichloroacetic acid, trichloroacetic acid, bromoacetic acid, propionic acid, 2-bromopropionic acid, 3-bromopropionic acid, lactic acid, n-butyric acid, isobutyric acid, crotonic acid, n-valeric acid, isovaleric acid, n-caproic acid, oenanthic acid, palargonic acid, capric acid, undecyclic acid, lauric acid, myristic acid, palmitic acid, stearic acid, oxalic acid, malonic acid, succinic acid, glutaric acid, adipic acid, pimelic acid, suberic acid, azelaic acid, citric acid, sebacic acid, alkylsuccinic acid, alkenylsuccinic acid, maleic acid, fumaric acid, itaconic acid, citraconic acid, mesaconic acid, glutonic acid, muconic acid, ethylidene malonic acid, isopropylidene malonic acid, allyl malonic acid.

Representative aromatic and cycloaliphatic monocarboxylic, dicarboxylic and polycarboxylic acids include 1,2-cyclohexanedicarboxylic acid, 1,4 - cyclohexanedicarboxylic acid, isophthalic acid, terephthalic acid, 1,8-naphthalenedicarboxylic acid, 1,2 - naphthalenedicarboxylic acid, tetrahydrophthalic acid, 3-carboxycinnamic acid, hydrocinnamic acid, pyrogallic acid, benzoic acid, ortho, meta and paramethyl, hydroxy, chloro, bromo and nitro-substituted benzoic acids, phenylacetic acid, mendelic acid, benzylic acid, hippuric acid, benzenesulfonic acid, toluenesulfonic acid, methanesulfonic acid and the like.

Other sources of hydrogen ions include carboxy polyesters prepared by the reaction of an excess of polycarboxylic acid or an anhydride thereof and a polyhydric alcohol to provide pendant carboxyl groups.

Still other materials capable of providing hydrogen ions are ion exchange resins having exchangeable hydrogen ions attached to base resins comprising cross-linked resinous polymers of monovinyl aromatic monomers and polyvinyl compounds. These resins are well known materials which are generally prepared by copolymerizing in the presence of a polymerization catalyst one or more monovinyl aromatic compounds, such as styrene, vinyl toluene, vinyl xylene, with one or more divinyl aromatic compounds such as divinyl benzene, divinyl toluene, divinyl xylene, divinyl naphthalene and divinyl acetylene. Following copolymerization, the resins are further treated with suitable acids to provide the hydrogen form of the resin.

Still another class of compounds which can be employed are ammonium compounds which decompose to provide hydrogen ions when an aluminosilicate treated with a solution of said ammonium compound is subjected to temperatures below the decomposition temperature of the aluminosilicate.

Representative ammonium compounds which can be employed include ammonium chloride, ammonium bromide, ammonium iodide, ammonium carbonate, ammonium bicarbonate, ammonium sulfate, ammonium sulfide, ammonium thiocyanate, ammonium dithiocarbamate, ammonium peroxysulfate, ammonium acetate, ammonium tungstate, ammonium molybdate, ammonium benzoate, ammonium borate, ammonium carbamate, ammonium sesquicarbonate, ammonium chloroplumbate, ammonium citrate, ammonium dithionate, ammonium fluoride, ammonium malonate, ammonium oxalate, ammonium palmitate, ammonium tartrate and the like. Still other ammonium compounds which can be employed include complex ammonium compounds such as tetramethylammonium hydroxide, trimethylammonium chloride. Other compounds which can be employed are nitrogen bases such as the salts of guanidine, pyridine, quinoline, etc.

A wide variety of metallic compounds can be employed with facility as a source of metallic cations and include both inorganic and organic salts of the metals of Groups I through VIII of the Periodic Table.

Representative of the salts which can be employed include chlorides, bromides, iodides, carbonates, bicarbonates, sulfates, sulfides, thiocyanates, dithiocarbamates, peroxysulfates, acetates, benzoates, citrates, fluorides, nitrates, nitrites, formates, propionates, butyrates, valerates, lactates, malonates, oxalates, palmitates, hydroxides, tartrates and the like. The only limitation on the particular metal salt or salts employed is that it be soluble in the fluid medium in which it is used. The preferred salts are the chlorides, nitrates, acetates and sulfates.

Representative metal salts which can be employed, include silver chloride, silver sulfate, silver nitrate, silver acetate, silver arsinate, silver bromide, silver citrate, silver carbonate, silver oxide, silver tartrate, calcium acetate, calcium arsenate, calcium benzoate, calcium bromide, calcium carbonate, calcium chloride, calcium citrate, beryllium bromide, beryllium carbonate, beryllium hydroxide, beryllium sulfate, barium acetate, barium bromide, barium carbonate, barium citrate, barium malonate, barium nitrite, barium oxide, barium sulfide, magnesium chloride, magnesium bromide, magnesium sulfate, magnesium sulfide magnesium acetate, magnesium formate, magnesium stearate, magnesium tartrate, manganese chloride, manganese sulfate, manganese acetate, manganese carbonate, manganese formate, zinc sulfate, zinc nitrate, zinc acetate, zinc chloride, zinc bromide, aluminum chloride, aluminum bromide, aluminum acetate, aluminum citrate, aluminum nitrate, aluminum oxide, aluminum phosphate, aluminum sulfate, titanium bromide, titanium chloride, titanium nitrate, titanium sulfate, zirconium chloride, zirconium nitrate, zirconium sulfate, chromic acetate, chromic chloride, chromic nitrate, chromic sulfate, ferric chloride, ferric bromide, ferric acetate, ferrous chloride, ferrous arsenate, ferrous lactate, ferrous sulfate, nickel chloride, nickel bromide, cerous acetate, cerous bromide, cerous carbonate, cerous chloride, cerous iodide, cerous sulfate, cerous sulfide, lanthanum chloride, lanthanum bromide, lanthanum nitrate, lanthanum sulfate, lanthanum sulfide, yttrium bromate, yttrium bromide, yttrium chloride, yttrium nitrate, yttrium sulfate, samarium acetate, samarium chloride, samarium bromide, samarium sulfate, neodymium chloride, neodymium oxide, neodymium sulfide, neodymium sulfate, praseodymium chloride, praseodymium bromide, praseodymium sulfate, praseodymium sulfide, selenium chloride, selenium bromide, tellurium chloride, tellurium bromide, etc.

Base exchange of the sodium or potassium for rare earth metal cations can be performed although their exchange is difficult due to the small cage structure of this new zeolite and the relatively large size of the rare earth metal cations.

While water will ordinarily be the solvent in the base exchange solutions employed, it is contemplated that other solvents, although generally less preferred, can be used in which case it will be realized that the above list of exchange compounds can be expanded. Thus, in addition to an aqueous solution, alcohol solutions and the like of the exchange compounds can be employed in producing the exchanged catalyst of the present invention. Generally, the alkali metal content is reduced to less than 4% by weight and preferably less than 1 weight percent. When the exchanged aluminosilicate is prepared, it is generally, thereafter, treated with a suitable solvent, e.g., water, to wash out any of the anions which may have become temporarily entrained or caught in the pores or cavities of the crystalline composition.

As indicated above, the aluminosilicates prepared by the method of this invention are formed in a wide variety of particular sizes. Generally speaking, the particles can be in the form of a powder, or made into a granule, or a molded product, such as extrudate having particle size sufficient to pass through a 2 mesh (Tyler) screen and be retained on a 400 mesh (Tyler) screen. In cases where the catalyst is molded, such as by extrusion, the aluminosilicate can be extruded before drying or dried or partially dried and then extruded.

If desired, the new catalyst can be incorporated with other materials, such as active and inactive inorganic materials which function as a matrix for the new catalyst. These inorganic materials include naturally occurring clays and metal oxides. The latter can be either naturally occurring or in the form of gelatinous precipitates or gels including mixtures of silica and metal oxides. The inactive materials suitably serve as diluents to control the amount of conversion in a given process so that the products can be obtained economically and orderly without employing other means for controlling the rate of reaction. Normally, the new zeolite is incorporated into a naturally occurring clay, such as bentonite, which improves the crush strength of the catalyst and makes it more suitable in commercial operations. These inorganic oxide matrix materials function as binders for the zeolite. Naturally occurring clays which can be composited with the new catalyst include the montmorillonite and kaolin family, which families include the sub-bentonites, and the kaolins commonly known as Dixie, McNamee-Georgia and Florida clays or others in which the main mineral constituent is halloysite, kaolinite, dickite, nacrite, or anauxite. Such clays can be used in the raw state as originally mined or initially subjected to calcination, acid treatment or chemical modification. One way to render the clay suitable for use is to treat them with sodium or potassium hydroxide, and calcine at temperatures ranging from 230° F. to 1600° F. Binders useful for compositing with the catalyst also include inorganic oxides, notably alumina.

In addition to the foregoing materials, the catalyst can be composited with a porous matrix material such as silica-alumina, silica-magnesia, silica-zirconia, silica-thoria, silica-beryllia, silica-titania as well as ternary compositions such as silica-alumina-thoria, silica-alumina-zirconia, silica-alumina-magnesia and silica-magnesia-zirconia. It can be formed as a cogel with one of these porous matrix materials. The relative proportions of finely divided novel crystalline aluminosilicate and inorganic oxide gel matrix vary widely with the crystalline aluminosilicate content ranging from about 1 to about 90% by weight and more usually, particularly when the composite is prepared in the form of beads employing techniques described, for example, in U.S. 3,140,249 in the range of about 2 to about 50 percent by weight of the composite.

One method of preparing the catalyst is to mix the various solutions employed containing the various oxides in a mixing nozzle so as to effect maximum contact of the respective ingredients together. This contact in a mixing nozzle precedes heating of any resultant solution and crystallization of the aluminosilicate.

The novel zeolite of this invention can contain a hydrogenation-dehydrogenation component, such as an oxide of a metal, a sulfide of a metal, or a metal of Groups VI and VIII of the Periodic Table, and manganese. Representative elements which can be incorporated in the zeolite are cobalt, nickel, platinum, palladium, ruthenium, rhodium, osmium, iridium, chromium, molybdenum, and tungsten. These materials either in their elemental form, as oxides, or sulfides can be impregnated into the zeolite or in cationic form can be exchanged into the zeolite for sodium or potassium cations. The methods for impregnation and/or exchange are those commonly used in the art. These hydrogenation-dehydrogenation components can be intimately combined by other means, as by physical admixture. The resultant catalyst, especially in a form containing less than 4 percent by weight alkali metal, preferably less than 1 percent, is useful in hydrocracking and reforming as well as other processes involving hydrogenation or dehydrogenation.

Employing the catalyst of this invention, lighter petroleum stock and similar lower molecular weight hydrocarbons can be hydrocracked at temperature between 400° F. and 825° F. using molar ratios of hydrogen to hydrocarbon charge in the range between 2 and 80. The pressure employed will vary between 10 and 2000 p.s.i.g. and the liquid hourly space velocity between 0.1 and 10.

Employing a form of the catalyst not containing a hydrogenation-dehydrogenation component, the catalyst can be employed for catalytic cracking, using a liquid hourly space velocity between about 0.5 and 50, a temperature between about 550° F. and 1100° F. and a pressure between subatmospheric and several atmospheres.

The composition in a catalytically active form such as the hydrogen form is useful in alkylation, polymerization, paraffin disproportionation and other acid catalyzed reactions provided the charge and the products are capable of passing through the pores of the catalyst.

In order to more fully illustrate the nature of the invention and the manner of practising the same, the following examples are presented. These examples include the best mode contemplated for carrying out the invention.

Example 1.—Into a solution weighing 2235 grams and comprising 30 percent by weight colloidal silica in a Waring Blendor was charged an aqueous solution comprising 105 grams sodium aluminate, 291 grams 98.7 percent NaOH, 162 grams 86.1 percent KOH and 1521 grams water. The mixture was allowed to age for 48 hours at room temperature. After aging for 48 hours, 3 drops of a 50 percent by weight aqueous tetramethylammonium chloride solution was added for every 2 ounces of amorphous mixture. The so-treated amorphous mixture was heated at 100° C. to effectuate crystallization. After 4 days, crystals were observed of submicron size having an X-ray diffraction pattern substantially that of pure offretite, i.e., a material which showed no "stacking faults" upon X-ray analysis. The material was observed to sorb 4.3 percent by weight normal hexane measured at 20° C. at a pressure of 20 mm. Hg.

Example 2.—Example 1 was repeated with the exception that 1.6 grams of a 50 percent by weight aqueous tetramethylammonium chloride solution per 200 grams of mixture was added to the amorphous mixture, and the aging of the amorphous mixture was eliminated. The crystallization time was 8 days and the resultant product had a crystal structure substantially identical to that of natural offretite. The resultant crystals had a particle size between 1 and 2 microns. Chemically they analyzed as follows:

| | Weight percent |
|---|---|
| Nitrogen | .73 |
| Sodium | 2.88 |
| Potassium | 8.31 |
| Alumina | 20.20 |
| Silica | 66.8 |
| Silica/alumina | 5.62 |

The crystals sorbed 15.4 weight percent water determined at 20° C. and 12 mm. Hg and 6.6 weight percent normal hexane determined at 20° C. and 20 mm. Hg.

Example 3.—Example 1 was repeated with the exception that the amorphous mixture was aged for 24 hours and 1.6 grams of tetramethylammonium chloride solution was added after aging for every 200 grams of amorphous mixture. The crystallization time was 20 hours and part of the crystals resulting from the preparation were submicron size.

Example 4.—Example 3 was repeated except that the aging of the amorphous mixture was over a period of 48 hours and the time of crystallization was 3 days. Most of the crystals were submicron size.

Example 5.—Example 4 was repeated with the exception that instead of employing 1.6 grams/200 grams, 0.8 gram/200 grams of tetramethylammonium chloride solution was employed. The crystallization time was 10 days and the product showed an X-ray analysis a crystal structure substantially the same as natural offretite. In particle size it was submicron.

Example 6.—Example 4 was repeated with the exception that instead of employing 1.6 grams of 50% tetramethylammonium chloride solution/200 grams hydrous oxide, 2.5 grams of 50% tetramethylammonium chloride solution/200 grams hydrous oxide was employed. The crystallization time was 10 days and the resultant crystals were mainly submicron in size.

Example 7.—Example 5 was repeated with the exception that instead of employing 0.8 gram of 50% tetramethylammonium chloride solution/200 grams hydrous oxide, 5.0 grams of 50% tetramethylammonium chloride solution/200 grams hydrous oxide was employed. The crystals of the product were submicron in size.

Example 8.—Example 7 was repeated except that instead of employing 5.0 grams of 50% tetramethylammonium chloride solution/200 grams hydrous oxide, 10 grams of 50% tetramethylammonium chloride solution/200 grams hydrous oxide was employed. Crystallization took place over a 6-day period and the product was determined by X-ray analysis to have a crystal structure substantially that of the natural offretite. The crystals of the product were submicron in size. The chemical analysis of the product is as follows:

| | Weight percent |
|---|---|
| Nitrogen | .97 |
| Sodium | 2.7 |
| Potassium | 6.9 |
| Alumina | 18.8 |
| Silica | 72.1 |
| Silica/alumina | 6.61 |

The crystals sorbed 16.0 weight percent water determined at 20° C. and 12 mm. Hg and 1.6 weight percent cyclohexane and 7.2 weight percent normal hexane, both determined at 20° C. and 20 mm. Hg.

Example 9.—Example 3 was repeated with the exception that the amorphous mixture was aged over a period of 7 days. The crystals which measured submicron in size were determined under X-ray analysis to have a crystal structure substantially that of natural offretite.

Example 10.—160.5 grams $NH_4Cl$ were added to 2545 grams of an aqueous slurry containing 3.93 grams of a zeolite prepared in accordance with the present invention. The balance of the slurry was water. The mixture was heated for 4 hours at 180° F. and filtered. The filter cake was mixed with 600 ml. of 5 molar $NH_4Cl$ and heated for 4 hours at 180° F. It was filtered, washed with 1000 ml. of water and divided into two equal portions.

Half of the wet cake weighing 1.56 grams was converted into a form containing nickel. 1.95 grams of $$NiNO_3:6H_2O$$

was dissolved in 10 ml. $H_2O$. The wet filter cake was mixed thoroughly with the nickel solution and let stand for 24 hours. It was then dried at 250° F., pelleted and calcined. It contained .85 weight percent nickel.

The balance of the ammonium zeolite was prepared into a form containing zinc. 1.56 grams of the wet filter cake were added to 231 ml. of 1 normal $Zn(NO_2)_2$ and the mixture was refluxed for 10 minutes after which it was filtered, washed with a liter of water, dried, pelleted and calcined. The resultant mixture contained 4 percent by weight zinc.

The nickel acid zeolite and zinc acid zeolite samples prepared above were tested for their ability to crack mixtures of hexanes. Each was charged into a separate vessel and a 50/50 mixture of normal hexane and isohexanes were passed through the vessel together with hydrogen. The temperature within the reaction vessel was 900° F.; the pressure was 500 p.s.i.g.; the liquid hourly space velocity of the mixture through the catalyst bed was about 3.0 and a hydrogen to hydrocarbon mole ratio was 14:1. In Table 3 below, there is set forth the weight percent conversion of the mixture of normal hexane and isohexanes hydrocracked employing these hydrocracking catalysts. The catalyst containing .85 weight percent nickel is designated in the table as Catalyst A and the catalyst containing 4.0 weight percent zinc is designated as Catalyst B in the table.

TABLE 3

Cracking of 50/50 mix of n-hexane and iso-hexanes

| Catalyst | n-Hexane conv., percent wt. | Iso-hexanes conv., percent wt. |
|---|---|---|
| A | 74.8 | 59.8 |
| B | 72.6 | 67.8 |

From the data above, it will be seen that the composition prepared in accordance with this invention when combined with a hydrogenation component is useful in hydrocracking mixtures of normal and isohydrocarbons.

An acid form of the composition of this invention was evaluated to determine its catalytic cracking activity as measured by its alpha value. Determinations of the alpha value were in accordance with the method of P. B. Weisz and J. N. Miale, Journal of Catalysis, volume 4, number 4, August 1965, pages 527–529. The catalyst gave the following values:

| Temperature | Time, minutes | | |
|---|---|---|---|
| | 2.0 | 5.0 | 25 |
| 650° F | | 138 | 117 |
| 750° F | | 144 | 118 |
| 850° F | 52 | 63 | 47 |

From the above data, it is seen that the composition is useful as a catalyst for cracking hydrocarbon.

In order to illustrate that compositions according to this invention can be prepared with varying amounts of sodium oxide and potassium oxide relative to alumina, the following examples are presented.

Example 11.—A composition in accordance with the present invention having the crystal structure of offretite was prepared using a hydrous mix containing the following, in terms of mole ratios of oxides:

$Na_2O$ ---------------------------------------- 11.41
$K_2O$ ----------------------------------------- 0.70
$SiO_2$ ---------------------------------------- 24.82
$Al_2O_3$ -------------------------------------- 1.00
Tetramethylammonium oxide ----------------- 1.30

The mixture was crystallized at 100° C. until crystallization appeared complete. The crystals had an X-ray powder diffraction pattern of natural offretite and were characterized by good crystallinity.

Example 12.—Example 11 was repeated except that the mole ratios of the components of the mixture were:

$Na_2O$ ---------------------------------------- 11.88
$K_2O$ ----------------------------------------- 0.27
$SiO_2$ ---------------------------------------- 24.82
$Al_2O_3$ -------------------------------------- 1.00
Tetramethylammonium oxide ----------------- 1.30

Crystals having the X-ray diffraction pattern of natural effretite were prepared.

Example 13.—Example 12 was repeated except that in addition to sodium oxide and potassium oxide, lithium oxide from lithium hydroxide was present in the mixture. The relative mole ratios were as follows:

$Na_2O$ ---------------------------------------- 9.33
$K_2O$ ----------------------------------------- 1.38
$Li_2O$ ---------------------------------------- 1.60
$SiO_2$ ---------------------------------------- 24.89
$Al_2O_3$ -------------------------------------- 1.00
Tetramethylammonium oxide ----------------- 1.30

Crystals of good crystallinity were prepared having the crystal structure of natural offretite. The product contained 2.4 weight percent sodium, 4.8 weight percent potassium and 2.0 weight percent lithium.

Example 14.—Example 12 was repeated except that the mole ratios of the components of the mixture were as follows:

$Na_2O$ ---------------------------------------- 9.38
$K_2O$ ----------------------------------------- 2.75
$SiO_2$ ---------------------------------------- 21.07
$Al_2O_3$ -------------------------------------- 1.00
Tetramethylammonium oxide ----------------- 1.30

A highly crystalline product having the structure of natural offretite was prepared.

Example 15.—Example 12 was repeated except that the mole ratios of the components of the mixture were as follows:

$Na_2O$ ---------------------------------------- 7.84
$K_2O$ ----------------------------------------- 2.75
$SiO_2$ ---------------------------------------- 20.75
$Al_2O_3$ -------------------------------------- 1.00
Tetramethylammonium oxide ----------------- 1.30

A highly crystalline composition having the crystal structure of natural offretite was prepared.

Example 16.—Example 12 was repeated except that the mole ratios of the components of the mixture were as follows:

$Na_2O$ ---------------------------------------- 11.71
$K_2O$ ----------------------------------------- 2.75
$SiO_2$ ---------------------------------------- 30.89
$Al_2O_3$ -------------------------------------- 1.00
Tetramethylammonium oxide ----------------- 1.30

A highly crystalline composition having the crystal structure of natural offretite was prepared.

Example 17.—Example 12 was repeated except that the mole ratios of the components of the mixture were as follows:

$Na_2O$ ---------------------------------------- 10.75
$K_2O$ ----------------------------------------- 1.38
$SiO_2$ ---------------------------------------- 24.87
$Al_2O_3$ -------------------------------------- 1.00
Tetramethylammonium oxide ----------------- 1.30

The crystallization occurred in a sealed vessel at average temperature of 362° F. under autogeneous pressure. Crystallization occurred in less than 6 hours. The crystals had a natural offretite crystal structure and were highly crystalline.

Example 18.—Example 17 was repeated except that the mole ratios of the components of the mixture were as follows:

$Na_2O$ ---------------------------------------- 9.39
$K_2O$ ----------------------------------------- 2.75
$SiO_2$ ---------------------------------------- 24.87
$Al_2O_3$ -------------------------------------- 1.00
Tetramethylammonium oxide ----------------- 1.30

Crystallization under autogeneous pressure at average temperature of 374° F. was complete in less than 6 hours yielding a highly crystalline material having the crystal structure of natural offretite.

The tetramethylammonium offretite zeolites prepared in accordance with this invention can be converted to other cationic forms as indicated above. Additionally, thermal treatment of a form of the zeolite containing tetramethylammonium cations at between 700° F. and 1300° F. for at least ½ at atmospheric or subatmospheric pressures yields a product useful in catalysis especially in forms low in alkali metal content. An acid form of the material which has been calcined at 800° F. and 1,000° F. shows the following sorption properties.

TABLE 4

| Calcination temperature, °F. | 800 | 1,000 |
|---|---|---|
| Equilibrium adsorption capacity, weight percent: | | |
| n-Hexane | | 7.88 |
| Isohexane | 3.71 | 3.04 |
| Cyclohexane | 2.86 | 2.86 |
| H$_2$O | | 14.83 |

The various hexane sorption properties were determined at 200 mm. Hg pressure, room temperature and the water sorption was determined at 12 mm. Hg pressure, room temperature.

The terms and expressions used herein are terms of description and not of limitation as there is no intention, in the use of such terms and expressions, of excluding any equivalents as many modifications and departures are possible within the scope of the invention claimed.

What is claimed is:

1. A hydrocarbon conversion process which comprises contacting a hydrocarbon charge under hydrocarbon conversion conditions with a catalyst comprising a synthetic crystalline aluminosilicate having a composition, in terms of mole ratios of oxides, as follows:

$$(1.1\pm.4)\ M_{2/n}O:Al_2O_3:5-8\ SiO_2:zH_2O$$

wherein M is a cation selected from the group consisting of hydrogen, ammonium, alkylammonium, arylammonium, metals, and mixtures thereof other than a mixture of sodium and potassium, n is the valence of M and z is between 0 and 8, having an X-ray powder diffraction pattern substantially the same as that shown in Table 1 of the specification said X-ray diffraction pattern being characterized by the absence of odd $l$ lines and capable of sorbing at least 1.5 weight percent cyclohexane at 25° C. and 20 mm. Hg.

2. A hydrocarbon conversion process according to claim 1 wherein said catalyst comprises a synthetic crystalline aluminosilicate having a composition, in terms of mole ratios of oxides as follows:

$$(1.1\pm.4)\ M_{2/n}O:Al_2O_3:5-8\ SiO_2:zH_2O$$

wherein M is a cation selected from the group consisting of tetramethylammonium, hydrogen, ammonium, metals other than alkali metals or mixtures thereof with one another, n is the valence of M and z is between 0 and 8, having an X-ray powder diffraction pattern substantially the same as that shown in Table 1 of the specification said X-ray diffraction pattern being characterized by the absence of odd $l$ lines and capable of sorbing at least 1.5 weight percent cyclohexane at 25° C. and 20 mm. Hg.

3. Method of cracking a hydrocarbon cracking stock which comprises contacting said stock under cracking conditions with a catalyst comprising a synthetic crystalline aluminosilicate having a composition, in terms of mole ratios of oxides, as follows:

$$(1.1\pm.4)\ M_{2/n}O:Al_2O_3:5-8\ SiO_2:zH_2O$$

wherein M is a cation selected from the group consisting of hydrogen, ammonium, alkylammonium, arylammonium, metals, and mixtures thereof other than a mixture of sodium and potassium, n is the valence of M and z is between 0 and 8, having an X-ray powder diffraction pattern substantially the same as that shown in Table 1 of the specification said X-ray diffraction pattern being characterized by the absence of odd $l$ lines and capable of sorbing at least 1.5 weight percent cyclohexane at 25° C. and 20 mm. Hg.

4. Method of cracking a hydrocarbon cracking stock according to claim 3 wherein M is selected from the group consisting of tetramethylammonium, hydrogen, ammonium and metals other than alkali metals, or mixtures thereof with one another.

5. Method of hydrocracking a hydrocarbon hydrocracking stock which comprises contacting said stock under hydrocracking conditions with a catalyst comprising a synthetic crystalline aluminosilicate having a composition in terms of mole ratios of oxides, as follows:

$$(1.1\pm.4)\ M_{2/n}O:Al_2O_3:5-8\ SiO_2:zH_2O$$

wherein M is a cation selected from the group consisting of hydrogen, ammonium, alkylammonium, arylammonium, metals and mixtures thereof other than a mixture of sodium and potassium, n is the valence of M and z is between 0 and 8, having an X-ray powder diffraction pattern substantially the same as that shown in Table 1 of the specification said X-ray diffraction pattern being characterized by the absence of odd $l$ lines and capable of sorbing at least 1.5 weight percent cyclohexane at 25° C. and 20 mm. Hg.

6. Method of hydrocracking a hydrocarbon hydrocracking stock according to claim 5 which comprises contacting said stock under hydrocracking conditions with a catalyst comprising the aluminosilicate defined in claim 5 wherein M is selected from the group consisting of tetramethylammonium, hydrogen, ammonium and metals other than alkali metals, or mixtures thereof with one another.

7. Method of hydrocracking a hydrocarbon hydrocracking stock according to claim 6 which comprises contacting said stock under hydrocracking conditions with a catalyst comprising the aluminosilicate wherein M comprises zinc.

8. Method of hydrocracking a hydrocarbon hydrocracking stock according to claim 6 which comprises contacting said stock under hydrocracking conditions with a catalyst comprising the aluminosilicate wherein M comprises nickel.

References Cited

UNITED STATES PATENTS

| 2,950,952 | 8/1960 | Breck | 23—113 |
| 3,140,251 | 7/1964 | Plank et al. | 208—120 |
| 3,474,025 | 10/1969 | Garwood | 208—111 |

DELBERT E. GANTZ, Primary Examiner

G. E. SCHMITKONS, Assistant Examiner

U.S. Cl. X.R.

208—120; 252—455 Z; 260—676 R, 683.58, 683.65, 695

PO-1050
(5/69)

UNITED STATES PATENT OFFICE
CERTIFICATE OF CORRECTION

Patent No. 3,687,839             Dated August 29, 1972

Inventor(s) Edwin Earl Jenkins

It is certified that error appears in the above-identified patent and that said Letters Patent are hereby corrected as shown below:

Column 3, line 20          "=.01-.79" should be --=.01-.70--

Column 3, line 66          " a stop or slow" should be
                                             --a step or slow--

Column 11, line 58         " effretite" should be --offretite--

Signed and sealed this 20th day of November 1973.

(SEAL)
Attest:

EDWARD M. FLETCHER, JR.         RENE D. TEGTMEYER
Attesting Officer                   Acting Commissioner of Patents